United States Patent
King et al.

(10) Patent No.: US 10,408,362 B2
(45) Date of Patent: Sep. 10, 2019

(54) FLOW CONTROL VALVE

(71) Applicant: Johnson Electric S.A., Murten (CH)

(72) Inventors: Edward Earl King, Dayton, OH (US); David Hugo Barnett, Urbana, OH (US)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 0 days.

(21) Appl. No.: 15/411,417

(22) Filed: Jan. 20, 2017

(65) Prior Publication Data

US 2018/0209558 A1 Jul. 26, 2018

(51) Int. Cl.
*F16K 27/04* (2006.01)
*F16K 11/07* (2006.01)
*F16K 31/06* (2006.01)
*H01F 7/06* (2006.01)
*H01F 7/16* (2006.01)
*H01F 7/08* (2006.01)

(52) U.S. Cl.
CPC ............ *F16K 27/048* (2013.01); *F16K 11/07* (2013.01); *F16K 31/0613* (2013.01); *H01F 7/064* (2013.01); *H01F 7/16* (2013.01); *H01F 7/1607* (2013.01); *H01F 2007/086* (2013.01); *Y10T 137/8671* (2015.04); *Y10T 137/86702* (2015.04)

(58) Field of Classification Search
CPC .... F16K 27/048; F16K 11/07; F16K 31/0613; F16K 11/0716; H01F 7/064; H01F 7/16; Y10T 137/8671; Y10T 137/86702; Y10T 137/86622
USPC ........................... 137/625.69, 625.68, 625.65
See application file for complete search history.

(56) References Cited

U.S. PATENT DOCUMENTS 9,746,071 B2 * 8/2017 Schudt ................ F16H 61/0206
2004/0155214 A1 * 8/2004 Kirsch ................ F16K 31/0613
                                                         251/129.15
2009/0057594 A1 * 3/2009 Tsujimoto ........... F16K 31/0613
                                                         251/324

(Continued)

FOREIGN PATENT DOCUMENTS

JP WO 2016076188 A1 * 5/2016 ............. F16H 61/00

OTHER PUBLICATIONS

Translation of WO2016076188.*

*Primary Examiner* — Kevin F Murphy
*Assistant Examiner* — Kelsey E Cary
(74) *Attorney, Agent, or Firm* — Muncy, Geissler, Olds & Lowe, P.C.

(57) ABSTRACT

A flow control valve includes a valve body having an bore and a plurality of fluid ports in communication with the bore. A valve spool is axially slidably disposed in the valve body, and an end portion of an end of the valve spool has a convex curved surface. A linear actuator is disposed at one end of the valve body and includes an armature slidable along an axial direction of the valve spool. The armature includes a head portion having a convex curved surface configured to abut against the end portion of the valve spool. The engagement structure between the valve spool and the armature of the flow control valve is improved, which enables the valve spool and the armature to be automatically aligned. This reduces the precision requirement of contact between the valve spool and armature, which facilitates mass production and reduces cost of the valves.

13 Claims, 4 Drawing Sheets

(56) References Cited

U.S. PATENT DOCUMENTS

| | | | | |
|---|---|---|---|---|
| 2011/0115587 A1* | 5/2011 | Ishibashi | .................. | H01F 7/081 |
| | | | | 335/255 |
| 2012/0048410 A1* | 3/2012 | Shimasaki | ............ | F01L 1/3442 |
| | | | | 137/596.13 |
| 2014/0014864 A1* | 1/2014 | Najmolhoda | ........... | F16K 31/06 |
| | | | | 251/129.15 |
| 2015/0176700 A1* | 6/2015 | Schudt | ................ | F16H 61/0206 |
| | | | | 137/625.65 |
| 2017/0314700 A1* | 11/2017 | Iwanaga | ............. | F16K 31/0675 |

\* cited by examiner

FLOW CONTROL VALVE

FIELD OF THE INVENTION

This invention relates to the field of flow control, and in particular to a flow control valve for controlling flow direction and pressure.

BACKGROUND OF THE INVENTION

Flow control valves are widely used in various flow control fields. For example, the flow control valve is used to control lubricant oil to lubricate a car engine system. One common flow control valve includes a valve body, a valve spool, a linear actuator and a restoring spring. The valve body includes an interior hollow chamber for receiving the valve spool. A sidewall of the valve body forms fluid ports to be in communication with the hollow chamber. Under the action of the linear actuator and the restoring spring, the valve spool is positioned at different locations to allow different fluid ports to be in communication with the hollow chamber, thereby controlling a flow direction of the fluid.

In general, in order to avoid unsmooth armature movement due to eccentricity between the valve spool and the armature of the linear actuator, the contact between the valve spool and the armature is required to have a high precision. In addition, in order to avoid leakage and achieve function of the valve, inner diameters of various portions of the valve are required to be precisely configured. These requirements bring great challenges to mass production and operation reliability of the valves.

DETAILED DESCRIPTION OF THE PREFERRED EMBODIMENTS

Figure 1:
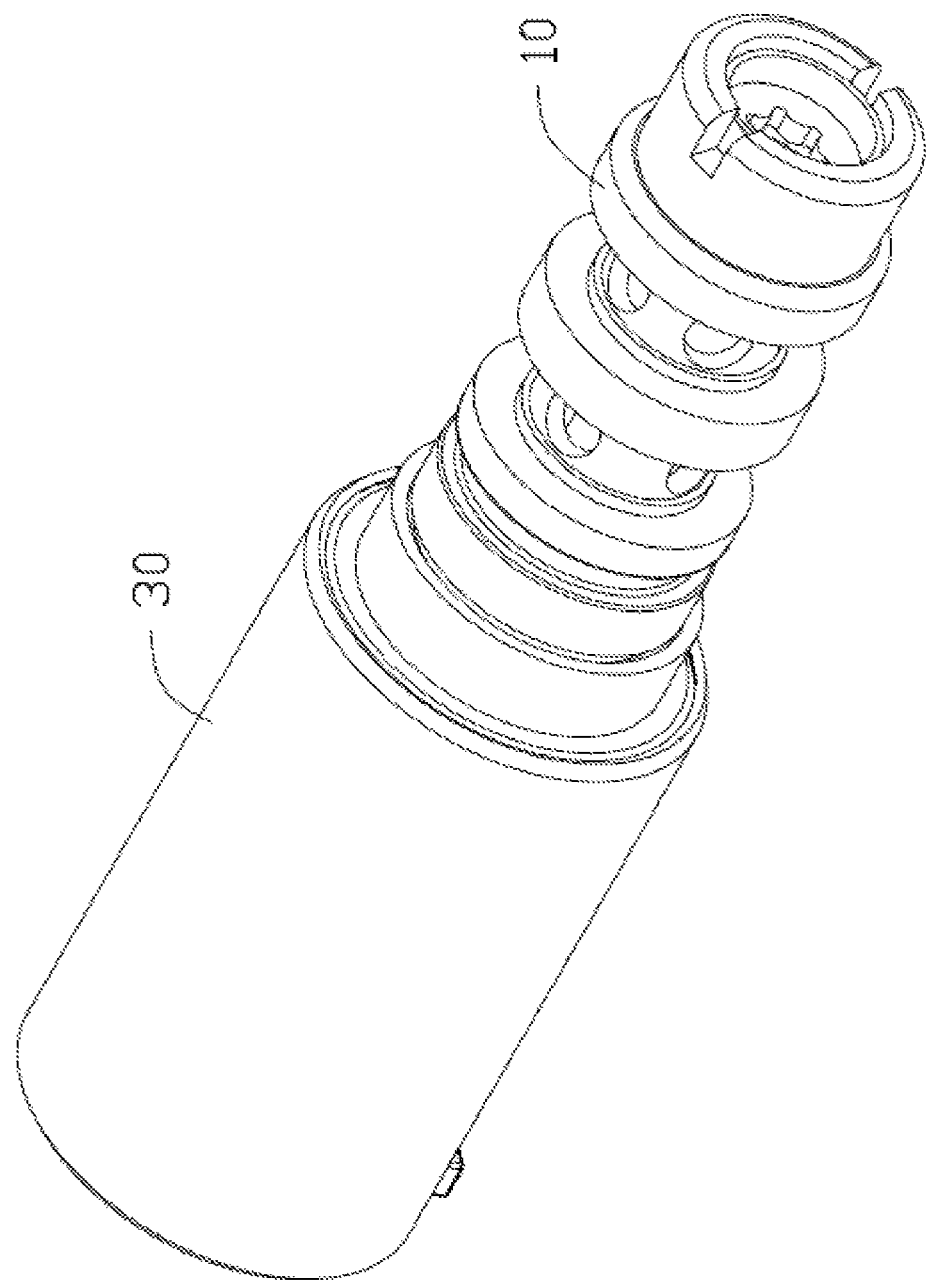
FIG. 1 is a perspective view of a flow control valve according to one embodiment of the present invention.

Various embodiments of the present invention will be described with reference to the accompanying drawings. In the description and drawings, like reference numerals designate like elements. It should be noted that the figures are merely illustrative rather than restrictive. It also should be noted that the figures are only intended to facilitate the description and are not drawn to scale. Unless otherwise specified, all technical and scientific terms have the ordinary meaning as understood by people skilled in the art.

It is noted that, when a component is described to be "fixed" or "mounted" to another component, it can be directly fixed or mounted to the another component or there may be an intermediate component. When a component is described to be "disposed" on another component, it can be directly disposed on the another component or there may be an intermediate component.

Figure 2:
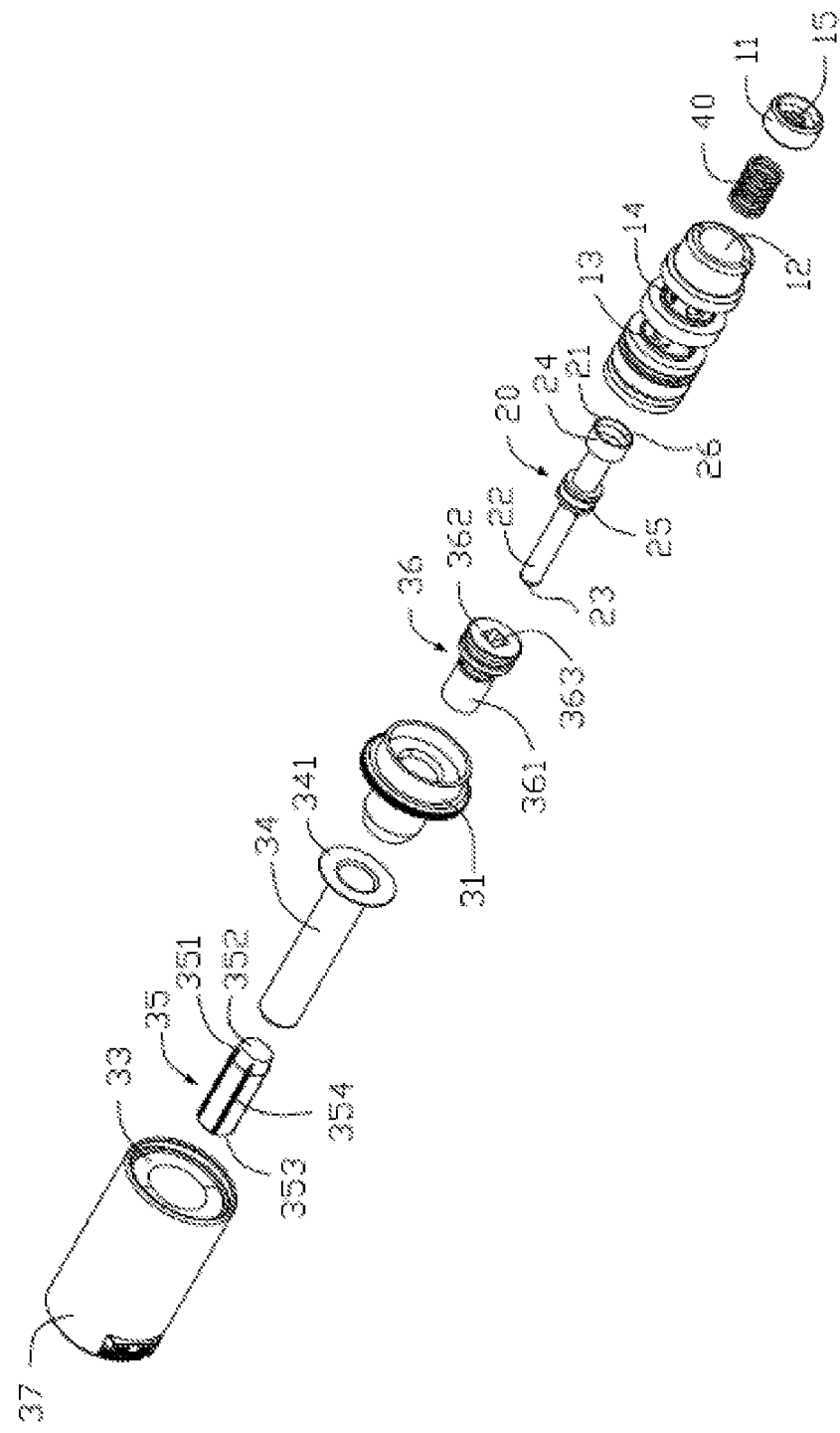
FIG. 2 is a partially exploded view of the flow control valve of FIG. 1.
Figure 3:
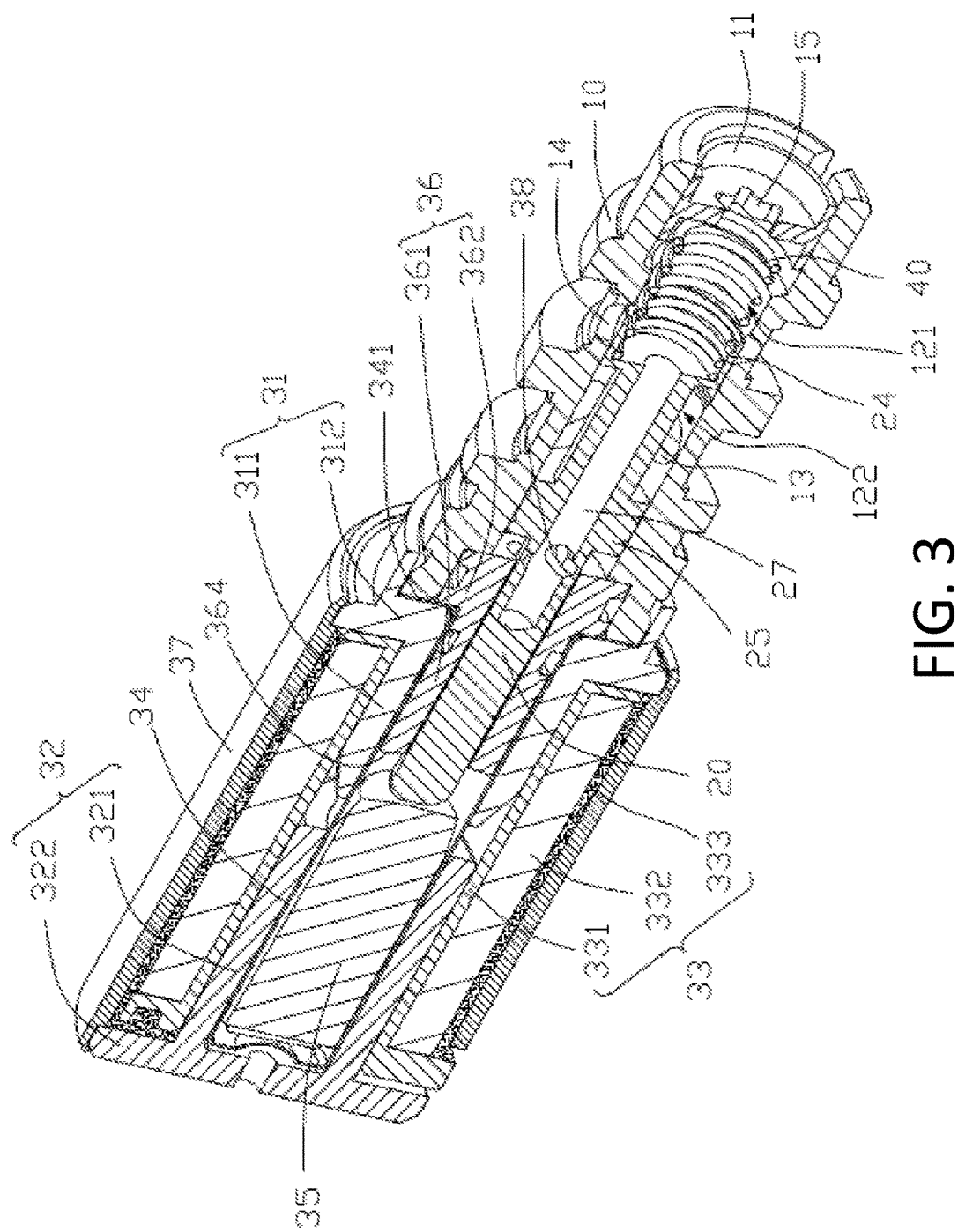
FIG. 3 is a sectional view of the flow control valve of FIG. 1.

Referring to FIG. 1 to FIG. 3, a flow control valve according to one embodiment of the present invention includes a valve body 10, a valve spool 20, a linear actuator 30, and a resilient member 40.

The valve body 10 is generally in the form of a hollow cylinder, including a first end opposite from the linear actuator 30 and a second end fixedly connected to the linear actuator 30. The valve body 10 includes an end cap 11 at the first end. The valve body 10 includes a bore 12 extending from the first end to the second end along an axial direction of the valve body 10. The valve body 10 forms three fluid ports in communication with the bore 12 which are sequentially arranged from the second end to the first end. In this embodiment, the fluid ports are a fluid inlet 13, a work port 14, and a backflow port 15, arranged in that sequence. The backflow port 15 is located at an axial end portion of the valve body 10 and formed in the end cap 11. The fluid inlet 13 connects to a high pressure fluid source such as an outlet of an oil pump. The work port 14 connects to a control port of a liquid control device, for regulating the pressure of the fluid source. The backflow port 15 usually connects to a fluid storage device, such as an oil tank, via a backflow pipe.

The valve spool 20 is axially-movably mounted in the bore 12 of the valve body 10, and includes a first end 21 and a second end 22. The first end 21 urges the end cap 11 through the resilient member 40. The second end 22 extends into the linear actuator 30. An end portion of the second end 22 forms a convex curved surface 23 facing an interior of the linear actuator 30. The convex curved surface 23 may be a second-order, third-order or higher-order revolving curved surface. In this embodiment, the end portion of the second end 22 is a spherical crown body, and the convex curved surface 23 facing the interior of the linear actuator 30 is a spherical crown surface. More specifically, the end portion of the second end 22 is a spherical crown body smaller than or equal to a hemisphere, and the convex curved surface 23 facing the interior of the linear actuator 30 is a spherical crown surface smaller than or equal to a hemispherical surface. The valve spool 20 forms a first protruding ring 24 and a second protruding ring 25 sequentially arranged from the first end 21 to the second end 22. The first protruding ring 24 is disposed at the first end 21. In this embodiment, an interior of the first protruding ring 24 is a hollow chamber 26, and a side of the first protruding ring 24 facing the resilient member 40 forms an opening. One end of the resilient member 40 extends into the hollow chamber 26 via the opening to urge the valve spool 20 and exert on the valve spool 20 a push force toward the linear actuator 30, such that the resilient member 40 and the valve spool 20 axially overlap, which can reduce the overall length and cost of the valve and make the valve more compact in size. In this embodiment, the resilient member 40 is a helical spring.

The valve spool 20 includes an axially-extending hollow chamber 27 in an interior thereof. One end of the hollow chamber 27 is in communication with the hollow chamber 26, and the other end of the hollow chamber 27 forms an outlet 28 between the second protruding ring 25 and the second end 22 of the valve spool 20. As such, on one hand, the weight of the valve spool 20 can be reduced, which makes action of the valve spool 20 more nimble and smoother during its sliding movement; on the other hand, this allows the fluid to enter the interior of the linear actuator 30 through the valve spool 20, which can not only provide lubricant function, but it also can reduce the resistance to the sliding movement of the linear actuator 30 and the valve spool 20.

The first protruding ring 24 has an outer diameter greater than that of the second protruding ring 25. Correspondingly, the bore 12 include two a first bore segment 121 and a second bore segment 122 with different inner diameters. The inner diameter of the first bore segment 121 is substantially equal to the outer diameter of the first ring 24. The inner diameter of the second bore segment 122 is substantially equal to the outer diameter of the second ring 25. Therefore, the first protruding ring 24 and the second protruding ring 25 can closely fit with an inner surface of the valve body 10 to thereby be able to block flow of the fluid. It should be understood that the inner surface of the valve body 10 and the surface of the valve spool 20 both have good smoothness, and the liquid flowing in the valve body 10 can lubricate the interface between the inner surface of the valve body 10 and the valve spool 20, and, therefore, the first protruding ring 24 and the second protruding ring 25 can still slide freely relative to the valve body 10 even they closely fit with each other. A smaller-diameter portion between the first protruding ring 24 and the second protruding ring 25 and the inner surface of the valve body 10 cooperatively define a flow passage. Because of the difference diameters of the first and second rings 24 and 25, a force exerted to the first ring 24 by the fluid in the flow passage between is greater than a force exerted to the second ring 24. The valve spool 20 can be driven to slide towards the first end of the valve body 10 by difference of the force on the first ring 24 and the second ring 25, if the force differences is great enough to overcome the spring force of the resilient member 40

In this embodiment, the linear actuator 30 is a solenoid, which includes a first magnetic pole block 31, a second magnetic pole block 32, a winding 32, a sleeve 34, an armature 35, a stop member 36, and an outer housing 37.

The first magnetic pole block 31 includes a hollow cylindrical first pole shoe 311 and a positioning portion 312 radially protruding from one end of the first pole shoe 311. The second magnetic pole block 32 includes a hollow cylindrical second pole shoe 321 and a positioning portion 322 radially protruding from one end of the second pole shoe 321. The first magnetic pole block 31 is disposed on the valve body 10. Specifically, in this embodiment, the positioning portion 312 of the first magnetic pole block 31 is fixedly mounted to the valve body 10. The first pole shoe 311 is located at one side of the positioning portion 312 opposite from the valve body 10 and is coaxially disposed with respect to the bore 12 of the valve body 10. The second magnetic pole block 32 and the first magnetic pole block 31 are coaxially disposed and are axially spaced apart from each other. The positioning portion 322 of the second magnetic pole block 32 is located at one end of the second pole shoe 321 opposite from the valve body 10.

The winding 33 includes a bobbin 331 sleeved around the first pole shoe 311 and the second pole shoe 321 that is made from an insulating material, a coil 332 wound around the bobbin 331, and a sealing layer 333 wrapping around the coil 332 and the bobbin 331. In this embodiment, the sealing layer 333 is made from a plastic material. The sealing layer 333 is formed by an over-molding process on an outer side of the coil 332 and the bobbin 331 to fix the coil 332 to the bobbin 331, thereby facilitating mounting operation of the winding 33.

The sleeve 34 is made from a non-ferromagnetic material such as aluminum, non-magnetic stainless steel, or plastic. The sleeve 34 is received in the interior of the first pole shoe 311 and the second pole shoe 321 and has an outer surface in ultimate contact with inner surfaces of the first pole shoe 311 and the second pole shoe 321. A holding portion 341 protrudes radially outwardly from one end of the sleeve 34 facing the valve spool 20. The holding portion 341 is sandwiched between the valve body 10 and the first magnetic pole block 31.

The armature 35 is slidably mounted within the sleeve 34 and has a head portion 351 faces one side of the valve body 10. In this embodiment, the head portion 351 of the armature 35 includes a convex curved surface 352 facing the valve body 10. The convex curved surface 352 may be a second-order, third-order or higher-order revolving curved surface. In this embodiment, the head portion 351 is a spherical crown body, and the convex curved surface 352 is a spherical crown surface. More specifically, the head portion 351 is a spherical crown body smaller than or equal to a hemisphere, and the convex curved surface 352 is a spherical crown surface smaller than or equal to a hemispherical surface. A tiny clearance is maintained between the armature 35 and the inner surface of the sleeve 34. In addition, in this embodiment, a circumferential surface of the armature 35 is formed with a plurality of grooves 354 that each extends from the head portion 351 to a tail portion 353 of the armature 35 along an axial direction of the armature 35. As such, the fluid from the bore 12 of the valve body 10 can flow through the armature 35 via the clearance between the armature 35 and the sleeve 34 and the grooves 354 in the surface of the armature 35, thus avoiding the resistance of the fluid to the armature 35 when the armature 35 moves.

The stop member 36 includes a hollow cylindrical receiving portion 361 and a holding portion 362 radially protruding from one end of the receiving portion 361. The receiving portion 361 is received in the sleeve 34, and the holding portion 362 is sandwiched between the valve body 10 and the sleeve 34. The receiving portion 361 has a through hole 363 extending along an axial direction of the valve spool 20. The through hole 363 has a non-circular cross section. The second end 22 of the valve spool 20 passes through the through hole 363 to contact with the head portion 351 of the armature 35. A sidewall defining the through hole 363 radially supports and positions the valve spool 20 at multiple locations. The sidewall defining the through hole 363 and the valve spool 20 form therebetween a flow channel at other locations of the sidewall, for allowing the fluid to flow therethrough. The stop member 36 forms a stop surface 364 at an end thereof opposite from the holding portion 363. The stop surface 364 stops further sliding of the armature 35 when the armature 35 has slid toward the valve body 10 and reached the stop member 36, i.e. has slid to its maximum travel. The stop surface 364 may be configured to have a concave surface that matches the profile of the head portion 351 of the armature 35. For example, if the head portion 351 is a spherical crown body, the stop surface 364 may be configured to be a concave spherical surface.

The outer housing 37 are open at opposite two ends, and receives the first magnetic pole block 31, the second magnetic pole block 32, the winding 33, the sleeve 34, and the armature 35. The two ends of the outer housing 37 are fixed to the positioning portion 312 of the first magnetic pole block 31 and the positioning portion 322 of the second magnetic pole block 32, respectively.

Figure 4:
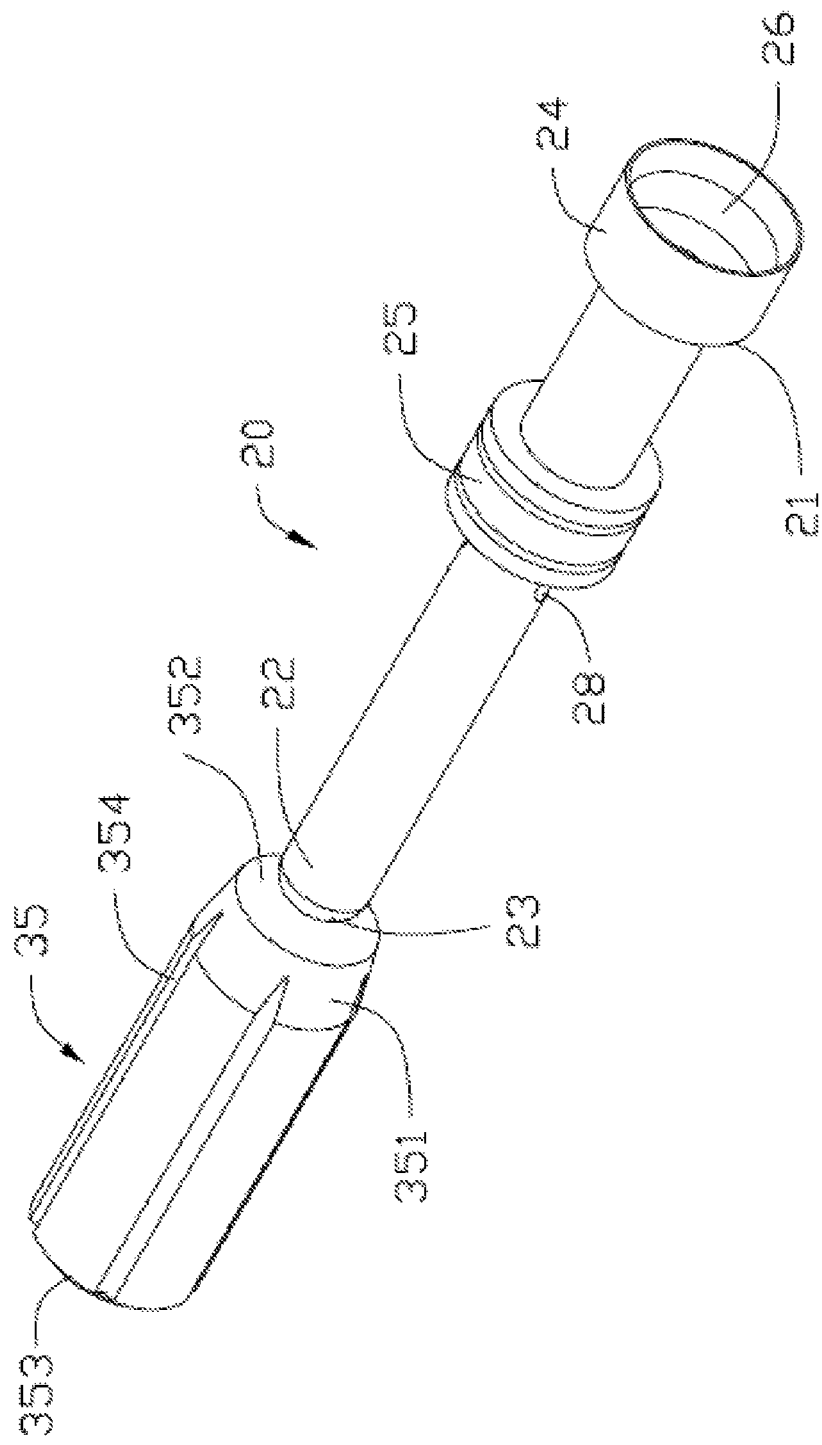
FIG. 4 is a view illustrating the engagement of the valve spool with the armature of the flow control valve of FIG. 1.

Referring to FIG. 3 and FIG. 4, upon power-on and initiation of the linear actuator 30, the armature 35 slides toward the valve body 10 under the electromagnetic force of the linear actuator 30. When the head portion 351 of the armature 35 abuts against the end portion of the second end 22 of the valve spool 20, the head portion 351 forces the valve spool 20 to slide together. The contacting surfaces between the head portion 351 of the armature 35 and the end portion of the second end 22 of the valve spool 20 are both convex curved surfaces and, in particular, in this embodiment, the head portion 351 and the end portion of the second end 22 of the valve spool 20 are both spherical crown bodies, and the contacting surfaces are both spherical crown surfaces. Therefore, during sliding, the head portion 351 of the armature 35 and the second end 22 of the valve spool 20 can be aligned with each other automatically, without the need of high alignment precision. This not only avoids the unsmooth sliding due to the eccentricity between the valve spool and the armature, but it also makes the valve more suitable for mass production and have a reduced cost.

It is understood that the valve spool 20 can slide back and forth along the bore 12 and positioned at different positions relative to the valve body 10 under the electromagnetic force of the linear actuator 20, the differences of the fluid force on the first ring 24 and the second ring 25, and the spring force of the resilient member 40. The electromagnetic force of the linear actuator 20 and the differences of the fluid force on the first ring 24 and the second ring 25 will drive the valve spool 20 forwards (towards the first end of the valve body 10). The spring force of the resilient member 40, which increases with the valve spool 20 sliding forwards, will drive first position backwards (towards the second end of the valve body 10). When the linear actuator 20 is power-off and the differences of the fluid force on the first ring 24 and the second ring 25 is not enough, the valve spool 20 is forced at a first position, where the first protruding ring 24 positioned between the fluid inlet 13 and the work port 14 to prevent a fluid communicating therebetween and enable a fluid communicating between the work port 14 and the backflow port 15. When the linear actuator 20 is power-on, the valve spool 20 is forced to slide forwarding under the electromagnetic force of the linear actuator 20 and the differences of the fluid force on the first ring 24 and the second ring 25, and overcoming the spring force of the resilient member 40 until being positioned at a second position, where the first protruding ring 24 positioned between the backflow port 15 inlet and the work port 14 to prevent a fluid communicating therebetween and enable a fluid communicating between the work port 14 and a fluid inlet 13. The electromagnetic force of the linear actuator 20 is adjustable in response to the differences of the fluid force on the first ring 24 and the second ring 25. The electromagnetic force increases when the differences of the fluid force on the first ring 24 and the second ring 25 is low, and become decreases when the differences of the fluid force on the first ring 24 and the second ring 25 is high. The differences of the fluid force on the first ring 24 and the second ring 25 has a positive correlation with the fluid pressure at the fluid inlet 13. Therefore, it is understood that when the fluid pressure at the fluid inlet 13 is great enough, the valve spool 20 can be forced to the second position only under the differences of the fluid force on the first ring 24 and the second ring 25, even if the linear actuator 20 is power-off.

Although the invention is described with reference to one or more embodiments, the above description of the embodiments is used only to enable people skilled in the art to practice or use the invention. It should be appreciated by those skilled in the art that various modifications are possible without departing from the spirit or scope of the present invention. The embodiments illustrated herein should not be interpreted as limits to the present invention, and the scope of the invention is to be determined by reference to the claims that follow.

The invention claimed is:

1. A flow control valve comprising:
   a valve body defining a bore and a plurality of fluid ports in communication with the bore;
   a valve spool axially slidably disposed in the valve body, the valve spool comprises a first end and a second end, the first end of the valve spool urges an end of the valve body through a resilient member, a solid end portion of the second end of the valve spool having a convex curved surface; and
   a linear actuator disposed at one end of the valve body, the linear actuator comprising an armature slidable along an axial direction of the valve spool, the armature comprising a head portion having a convex curved surface, the convex curved surface of the head portion of the armature configured to abut against the convex curved surface of the end portion of the valve spool; the valve body comprises a first end opposite from the linear actuator and a second end fixedly connected to the linear actuator, and the plurality of fluid ports comprises a fluid inlet, a work port, and a backflow port sequentially arranged on the valve body from the second end to the first end thereof; the valve body further comprises an end cap at the first end of the valve body; and the backflow port is located at an axial end portion of the valve body and formed in the end cap; the valve spool is formed with a first protruding ring and a second protruding ring; the first protruding ring having a maximum outer diameter greater than that of the second protruding ring, and a smaller-diameter portion between the first protruding ring and the second protruding ring and the inner surface of the valve body cooperatively define a flow passage; a circumferential surface of the armature is formed with a plurality of grooves that each extends from the head portion to a tail portion of the armature along an axial direction of the armature.

2. The flow control valve of claim 1, wherein the convex curved surface of the end portion of the valve spool and the convex curved surface of the head portion of the armature are both second-order or higher-order revolving curved surfaces.

3. The flow control valve of claim 2, wherein the convex curved surface of the end portion of the valve spool and the convex curved surface of the head portion of the armature are both spherical crown surfaces.

4. The flow control valve of claim 3, wherein the spherical crown surfaces of the end portion of the valve spool and the head portion of the armature are both smaller than or equal to hemispherical surfaces.

5. The flow control valve of claim 1, wherein the linear actuator further comprises a stop member configured to stop further forward sliding of the armature when the armature has slid to its maximum travel.

6. The flow control valve of claim 5, wherein the stop member has a through hole along an axial direction of the valve spool, and the through hole allows the valve spool to pass therethrough to abut against the head portion of the armature.

7. The flow control valve of claim 6, wherein the through hole has a non-circular cross section, a sidewall defining the through hole radially supports and position the valve spool at multiple locations, and the sidewall defining the through hole and the valve spool form therebetween a flow channel at other locations of the sidewall.

8. The flow control valve of claim 7, wherein the stop member forms a stop surface facing the head portion of the armature, and the stop surface is a concave surface.

9. The flow control valve of claim 1, wherein the valve spool is slidable relative to the valve body between a first position where the first protruding ring positioned between the fluid inlet and the work port to prevent a fluid communicating therebetween and enable a fluid communicating between the work port and the backflow port, and a second position where the first protruding ring positioned between the backflow port and the work port to prevent a fluid communicating therebetween and enable a fluid communicating between the work port and a fluid inlet.

10. The flow control valve of claim 9, wherein the first protruding ring is disposed on the end portion of the first end of the valve spool, an interior of the first protruding ring is a first hollow chamber, and a side of the first protruding ring facing the resilient member forms an opening, a first end of the resilient member extends into the first hollow chamber via the opening to urge the valve spool and exert on the valve spool a push force toward the linear actuator, and a second other end of the resilient member abuts against the end portion of the valve body.

11. The flow control valve of claim 10, wherein the resilient member is a helical spring.

12. The flow control valve of claim 10, wherein the valve spool forms the second protruding ring, the first protruding ring and the second protruding ring are sequentially arranged from the first end to the second end of the valve spool; the valve spool includes a second hollow chamber extending along an axial direction of the valve spool, one end of the second hollow chamber of the valve spool is in communication with the first hollow chamber of the first protruding ring, and the other end of the second hollow chamber of the valve spool has an outlet within the second protruding ring and the valve spool.

13. The flow control valve of claim 1, wherein the linear actuator is a solenoid.

* * * * *